United States Patent
Raffo (10) Patent No.: US 7,860,810 B2
(45) Date of Patent: Dec. 28, 2010

(54) DISCRETE EVENT SYSTEM AND METHOD FOR SIMULATING GLOBAL PRODUCT DEVELOPMENT

(75) Inventor: David M. Raffo, Tigard, OR (US)

(73) Assignee: State of Oregon acting by and through the State Board of Higher Education on behalf of Portland State University, Portland, OR (US)

( * ) Notice: Subject to any disclaimer, the term of this patent is extended or adjusted under 35 U.S.C. 154(b) by 736 days.

(21) Appl. No.: 11/630,511

(22) PCT Filed: Jun. 16, 2005

(86) PCT No.: PCT/US2005/021545

§ 371 (c)(1),
(2), (4) Date: Sep. 21, 2007

(87) PCT Pub. No.: WO2006/007443

PCT Pub. Date: Jan. 19, 2006

(65) Prior Publication Data

US 2008/0097734 A1    Apr. 24, 2008

Related U.S. Application Data

(60) Provisional application No. 60/580,840, filed on Jun. 16, 2004.

(51) Int. Cl.
*G06G 7/48* (2006.01)
*G06F 9/44* (2006.01)
(52) U.S. Cl. .............................. 706/6; 717/103; 717/104
(58) Field of Classification Search ..................... 703/6, 703/22; 717/100–104
See application file for complete search history.

(56) References Cited

U.S. PATENT DOCUMENTS

| 6,408,403 | B1 | 6/2002 | Rodrigues et al. |
| 6,505,204 | B1 | 1/2003 | Fanjoy |
| 2002/0152456 | A1 | 10/2002 | Nightingale et al. |
| 2004/0049372 | A1* | 3/2004 | Keller .......................... 703/22 |
| 2004/0107085 | A1* | 6/2004 | Moosburger et al. .......... 703/13 |
| 2008/0091403 | A1* | 4/2008 | Harrison et al. ............... 703/17 |
| 2010/0017185 | A1* | 1/2010 | Bade et al. ..................... 703/13 |

OTHER PUBLICATIONS

Martin et al., A Model of the Software Development Process Using Both Continuous and Discrete Models, 2000, Software Process Improvement and Practice, pp. 147-157.*

(Continued)

*Primary Examiner*—Paul L Rodriguez
*Assistant Examiner*—Aniss Chad
(74) *Attorney, Agent, or Firm*—Klarquist Sparkman, LLP (57) ABSTRACT

A global software development model instrument is described. The instrument utilizes a global system dynamics model, as well as one or more site-specific discrete event simulation and system dynamics models to model interactions within and between software development sites. Parameters, equations, and interactions between the model components are editable to allow for the simulation and comparison of various software development options and to provide for global software development research. Additional product development situations can be modeled as well, including hardware and systems engineering.

22 Claims, 5 Drawing Sheets

Components of a Global Software Development Model Instrument

OTHER PUBLICATIONS

Krahl, The Extend Simulation Environment, Proceedings of the 2001 Winter Simulation Conference B. A. Peters, J. S. Smith, D. J. Medeiros, and M. W. Rohrer, eds.*

Krahl, The Extend Simulation Environment, Proceedings of the 2000 Winter Simulation Conference J. A. Joines, R. R. Barton, K. Kang, and P. A. Fishwick, eds.*

Goldmann et al., Distributed Process Planning Support with MILOS, Int. J. Software Engineer. Knowledge Engineer. vol. 10, No. 4, pp. 511-525. Aug. 2000.*

International Search Report from PCT/US05/21545 dated Oct. 17, 2005.

* cited by examiner

Components of a Global Software Development Model Instrument

DISCRETE EVENT SYSTEM AND METHOD FOR SIMULATING GLOBAL PRODUCT DEVELOPMENT

CROSS REFERENCE TO RELATED APPLICATION

This application claims the benefit of the filing date of U.S. provisional application No. 60/580,840, filed Jun. 16, 2004, which is incorporated herein by reference.

TECHNICAL FIELD

The invention relates generally to product development, including software, hardware, and systems engineering.

BACKGROUND

Product manufacturers, especially those developing software projects, are increasingly turning toward the use of distributed development processes over more-centralized development techniques. Advantages to distributing development projects include the ability to utilize more resources than can easily be contained at a single site, and efficient use of disparate groups with unique development skills.

Some software manufacturers choose to maximize these effects by developing software on a global scale, utilizing multiple development sites located around the world. In some circumstances, the use of internationally-based development teams can provide what is known as a "follow the sun" approach to software development, where work on a project is handed off from development site to development site, allowing continuous approach that can potentially run 24 hours a day. Additionally, costs may be reduced by utilizing developers from countries which have historically cheaper labor and resource costs. By avoiding the limitations inherent in locating all development within a single country, it is thought that many, if not all, of the efficiencies described above can be captured by a software manufacturer.

However, the software industry, especially in non-western countries, has only existed for a short period of time and communications technologies which enable global software development have not existed at their present quality until recently. Because of this, neither developers nor academics have had substantial experience with which to judge the benefits of global software development. A similar lack of experience exists with respect to potential drawbacks of global software development, such as delays brought on by communications difficulties, differences in product quality from different sites, or the difficulty of overseas supervision. This can be frustrating to companies which are attempting to determine whether or not to outsource projects, or entire products, to foreign development teams. When planning for a long-term development project, companies need the ability to consult the available software development theories and data and determine the potential outcomes of the various opportunities available to them, whether they be centralized, or distributed globally.

Likewise, academics and policymakers are concerned with macro-level effects of global software development. Innovation and jobs sparked by globally-developed software projects may improve the economy or resources of development-site countries. In contrast, developed nations are concerned with the effects of manufacturers moving existing software development projects abroad to poorer nations or starting projects in less-developed countries. While concerns about industry transfer have existed for decades, in the past, countries were concerned with these effects to a lesser degree because it was assumed that jobs that moved or were created abroad would be replaced by higher-paying, higher-skilled jobs back at home due to increases in innovation. However, in the realm of software development, the movement of jobs and development projects is happening at higher skill and pay levels, suggesting that previous economic theories and assumptions may no longer work.

In both of these situations, manufacturers, academics, and policymakers are finding that their knowledge of the changing face of software development is inadequate and difficult to parlay into real predictions. Some work has been done to study global software development, such as work done by James Herbsleb and Audris Mockus in *IEEE Transactions on Software Engineering*. However, so far no work has been done which captures the dynamic and varied interactions between multiple development sites. What is needed is a way of modeling and simulating software development on a global scale over multiple development sites which provides useful and predictive data to aid in software development and technology policy decision making.

SUMMARY

A system for simulating product development taking place at one or more development sites is described. The system comprises a plurality of discrete event product development simulation models which are configured to operate on site-specific product development data to produce simulation metrics. The system also comprises a plurality of system dynamics simulation models which are configured to operate on product development data and simulation metrics to produce simulation metrics. A computer-readable medium is also described containing data which describe a global software development model for a software development project spanning a plurality of development sites. The described model comprises a global system dynamics model, a plurality of site-specific system dynamics models, and a plurality of site-specific discrete event simulation models. The site-specific discrete event simulation models are configured to operate on site-specific product data to produce simulation metrics. The site-specific system dynamics models are configured to interact with the site-specific discrete event models, receive data and metrics, and produce simulation metrics. The global system dynamics model is configured to interact with the plurality of site-specific system dynamics models, receive data and metrics, and produce global product development simulation metrics.

A method of simulating global software development is described. The method comprises collecting software development data from a plurality of software development data sites, passing the data as simulation parameters to a global software development model which comprises a global system dynamics model and a plurality of discrete event simulation models, and receiving simulated software development results data by utilizing the global software development model to simulate the project. The discrete event simulation models are configured to produce site-specific simulation metrics from software development data and the global system dynamics model is configured to accept data and simulation metrics and to produce global simulation metrics.

Additional features and advantages of the invention will be made apparent from the following detailed description of embodiments that proceeds with reference to the accompanying drawings.

DETAILED DESCRIPTION

The following description is directed to techniques and components of a global software development model instrument. The instrument provides a general structure for a global software development model, which can be used to facilitate research about global software development, as well as providing a tool which can be used by a software manufacturer when considering global software development or planning changes in an existing global project. In one implementation, this is achieved through the use of site-specific discrete event simulation models, combined with a global system dynamics model, providing what can be termed a "hybrid" simulation model. The interactions between the site-specific discrete models and the global system dynamics model are facilitated in one implementation through the use of site-specific system dynamics or hybrid simulation models.

The description presents an exemplary application of this technique in a personal computer utilizing a database and a network connection, although in alternate implementations, different computing environments or connections may be used. Additionally, while the techniques described herein are done with particular emphasis toward software development, the technology described is applicable to other product development as well, such as hardware or systems engineering.

1. Illustrated Implementation of a Global Software Development Instrument

Figure 1:
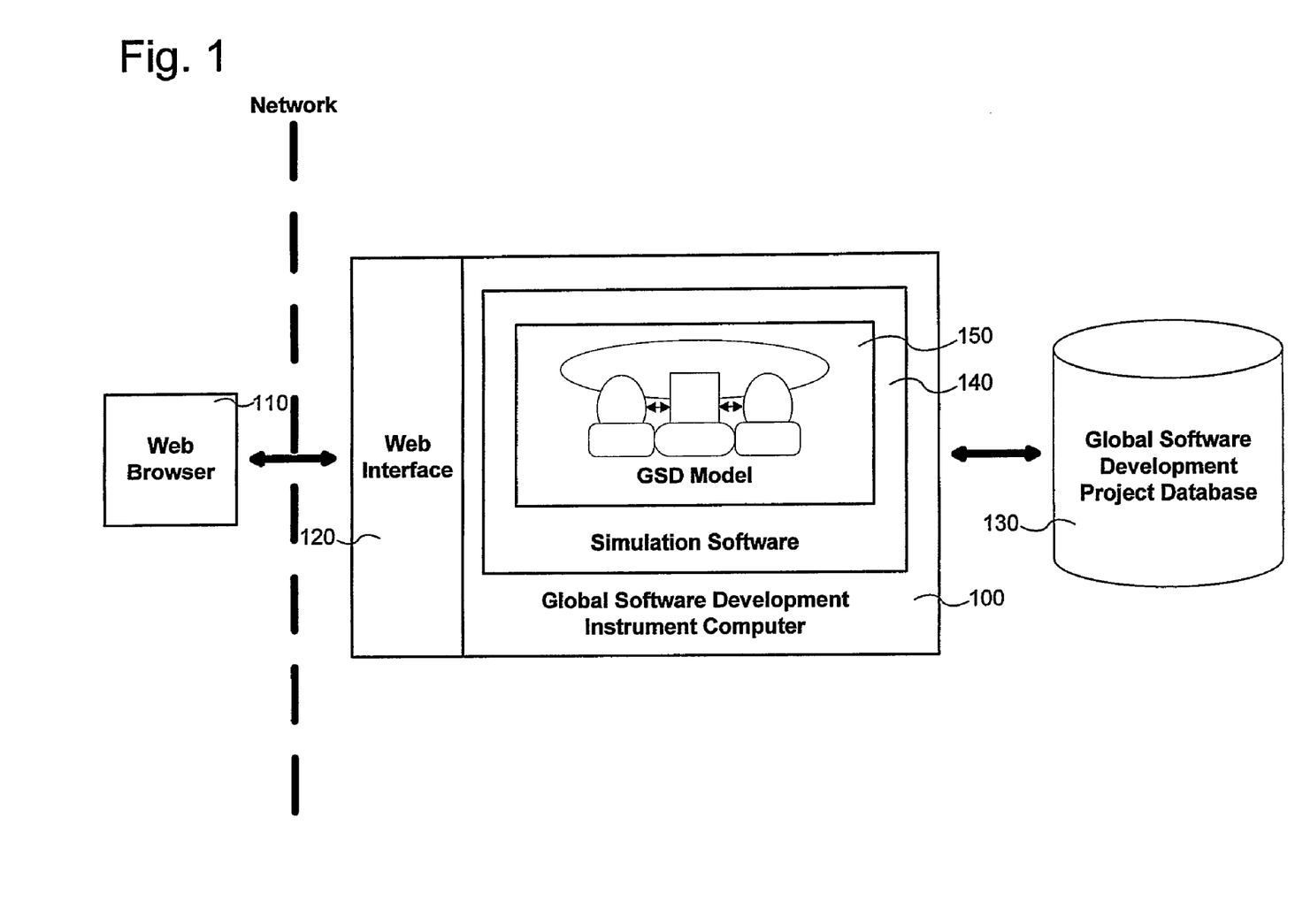
FIG. 1 is a block diagram illustrating one implementation of a global software development model instrument which is used to model a global software development process.

FIG. 1 illustrates one implementation of components of a global software instrument. In the illustrated implementation, the global software development instrument comprises a model and software running on a global software development instrument computer 100. As will be described below, in various implementations the global software development instrument computer 100 can comprise various forms and computing environments, including personal computers and web servers. FIG. 1 also illustrates a web browser 110, which communicates over a network with the global software development instrument computer 100 through a web interface 120. The web interface 120 allows a user access to data from any global software development modeling, as well as the ability to change global software development modeling parameters and to perform simulations of global software development. In another implementation, the web browser also allows manipulation one or more models or model components on the global software development instrument computer 100, or of equations which the model on the computer 100 utilizes to process modeling parameters. In alternative implementations, the web browser allows manipulation of data utilized by the instrument computer 100 or of reports generated by the computer.

In one implementation, the web interface comprises a software component which runs on the global software development instrument computer 100. In another implementation, the web interface 120 can comprise a second computer which processes requests for information or simulation commands and parameters from the web browser 110 and relays the information to the global software development instrument computer 100. The form of the communication with a user at the web browser can vary between implementations as well. In various implementations, the web interface 120 can supply information and control capabilities to a user through the web browser 110 via technologies including, but not limited to: a java applet served by the web interface, a static HTML page, a dynamically-generated HTML page, PERL, CGI, PHP, ASP, or Javascript.

In one implementation, a user can control or access information from a global software development model by opening a standard URL signifying a network location of the web interface. In another, it may be desired to not make the web interface 120 visible over an entire network and the connection between the web browser 110 and the web interface 120 may comprise a direct link rather than a networked link. Depending on the implementation of the global software development instrument, the network depicted in FIG. 1 may comprise various communications networks or protocols, including the Internet, a LAN, a Bluetooth connection, an intranet, or a direct dialup into the web interface. Finally, while only one web browser is illustrated in FIG. 1, in various implementations the web interface is configured such that it can communicate with more than one web browser simultaneously. In one such implementation, the web interface 120 may allow control of simulation using the global software development instrument to only one web browser at a time, in order to prevent conflicting commands or parameters, while still providing information to the multiple web browsers.

FIG. 1 also illustrates a global software development project database 130. In one implementation, this database contains information useful to simulations of global software development, such as, but not limited to, cost statistics, defect injection rates, scheduling data, and manpower requirements. In another implementation, the database 130 contains results of global software development simulations, such as project cost, project quality, or project time. More examples of simulation parameters and simulation results are given below. In yet another implementation, the global software development project database can comprise a global development data repository which will hold data gained from research about global software development, such as the labor costs or time requirements associated with development in a particular nation or development site. In one implementation, the global development data repository will be populated over time, as researchers in the area of global software development continue to develop new empirical data.

FIG. 1 also illustrates simulation software 140 and a global software development model 150. In one implementation, the simulation software 140 comprises a modeling and simulation tool, such as the Extend tool by Imagine That!, which provides an environment for manipulating simulation blocks representing software development processes and relating the blocks to each other to create a valid model. In this implementation, the GSD model 150 can comprise such blocks, combined to create the model. In one implementation, one or more blocks comprise generic software modeling blocks of the type described in U.S. patent application Ser. No. 10/838,494, which is herein incorporated by reference. In alternate implementations, the global software development model 150 and simulation software 140 are integrated into software modules and are not separated along simulation software/model lines. In one such implementation, the combined software 140 and model 150 can comprise a stand-alone application. Additionally, in some implementations, the web browser 120 can also be combined with the simulation software 140 and GSD model 150. Components of one implementation of a GSD model 150 are described below.

Figure 2:
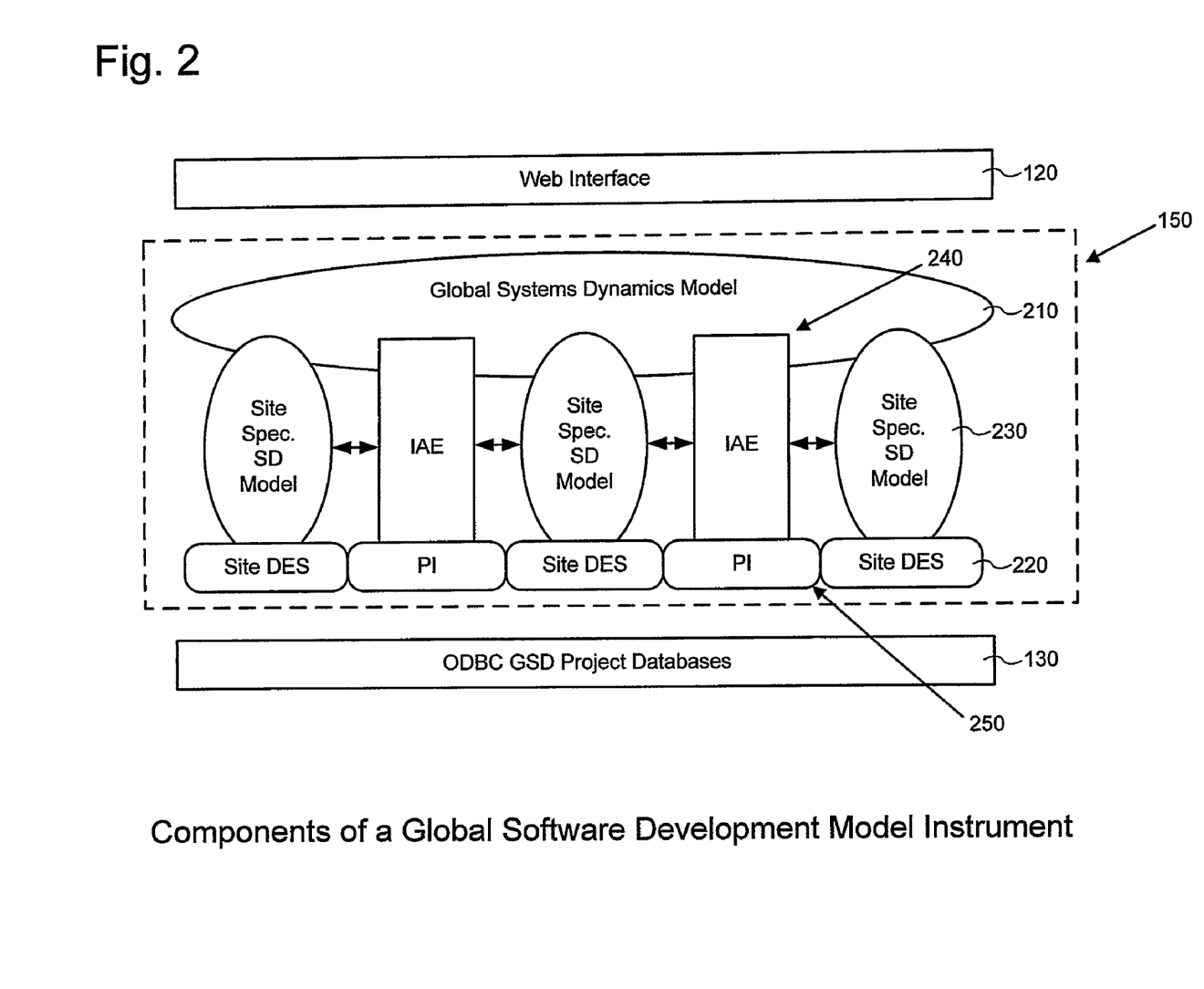
FIG. 2 is a block diagram illustrating, in one implementation, components of an exemplary global software development model instrument.

FIG. 2 illustrates components of a global software development model instrument. In the center of FIG. 2, a global software model 150 is illustrated within the dashed lines, sandwiched between the web interface 120 and the global software project database 130, which in the illustrated implementation utilizes ODBC architecture. The orientation of FIG. 2 illustrates one concept of the design of the global software development model instrument, that the web interface lies "on top of" the model, which is "on top of" the database. Thus, in a typical implementation, the basic data will be kept in the database 130, interpreted through the actions of the global software development model 150, and relayed to a user through the web interface 120. While neither the computer 100 nor the simulation software 140 are illustrated in FIG. 2, the Figure is primarily concerned with showing general structural associations and thus does not illustrate them; various implementations of the computer and simulation software are discussed above.

FIG. 2 also illustrates one implementation of various components of a global software development model. FIG. 2 does not illustrate that a single model necessarily will cover every global development situation; in various implementations, the global software development model 150 may be modified to better model global development depending on product type, project needs, manufacturer type or resources, or other factors. Additionally, because in some implementations, modeling blocks can be used which can call software modules, in one case in the form of DLLs, some implementations can incorporate additional software modules which are not illustrated in FIG. 2 for the sake of simplicity. In one implementation, the models comprise relations and generalized equations through which software development data can be operated to create outputs describing various simulated metrics.

As illustrated in the implementation of FIG. 2, the global software development model is comprised of a single global system dynamics model 210, which interacts with various site-specific discrete event simulation models 220 through site-specific system dynamics models. 230. It is this interaction between a plurality of site-specific models and one global system dynamics model that facilitates a robust simulation of global software development, modeling both peculiarities of individual development sites as well as interactions between the sites. And, by using multiple models and model components associated with each site and with intersite interaction, the global software development model instrument allows particularized customization and study of each development site of a given software development project. Although multiple site-specific models are illustrated in FIG. 2, in alternate implementations a model illustrating development at a single site, and thus containing only one of each type of site-specific component, can also be created.

In one implementation, the global system dynamics model, as well as the site-specific system dynamics models, are concerned with modeling factors such as, but not limited to, coordination, communication, culture, manpower allocation, productivity, staffing, and skills. Thus, the global system dynamics model 210 is configured to address those factors across the various development sites, and to account for those factors as they dynamically vary based on interactions with site-specific models and the discrete event models. By contrast, each site-specific system dynamics model 230 is configured to address these factors as they relate to a specific site and to facilitate interactions between the global system dynamics model 210 and the site-specific discrete event simulation models 220. In order to further facilitate interactions between the various site-specific system dynamics models, FIG. 2 also illustrates one or more interaction effects dynamics model components 240, which models dynamic interactions between the sites.

The site-specific discrete event simulation models address factors which are closer to individual discrete development tasks, such as, but not limited to, process, product, productivity, coordination, staffing, quality assurance, and development type. Thus, each site-specific discrete event simulation model 220 will model actual processes occurring at the development site with which it is associated. In order to facilitate interactions between processes occurring at development sites, one or more discrete event process interaction components 250 contain factors which address inter-site interfacing.

As an example of the interactions that might take place between the components illustrated in FIG. 2, the global system dynamics model 210 can control overall quality, productivity, project management, and schedule. Based upon global quality level monitored in the global system dynamics model 210, manpower can be allocated to various verification and validation activities modeled in the site-specific system dynamics models across the development sites, and then assigned to specific tasks in the site-specific discrete event simulation models 220. Error injection, detection and rework rates simulated at each site will depend upon a variety of site-specific parameters such as: productivity, motivation, and developer skill as well as product characteristics such as size and complexity. Thus, some project characteristics will be managed in the site-specific system dynamics models. These rates will also be affected by the coordination strategy and communication factors between specific sites. All of these factors will then affect the process that is represented in the site-specific discrete event simulation model. Model parameters, data, and simulation results can then be linked to the global software development database 130.

2. Development of a Global Software Development Model

Figure 3:
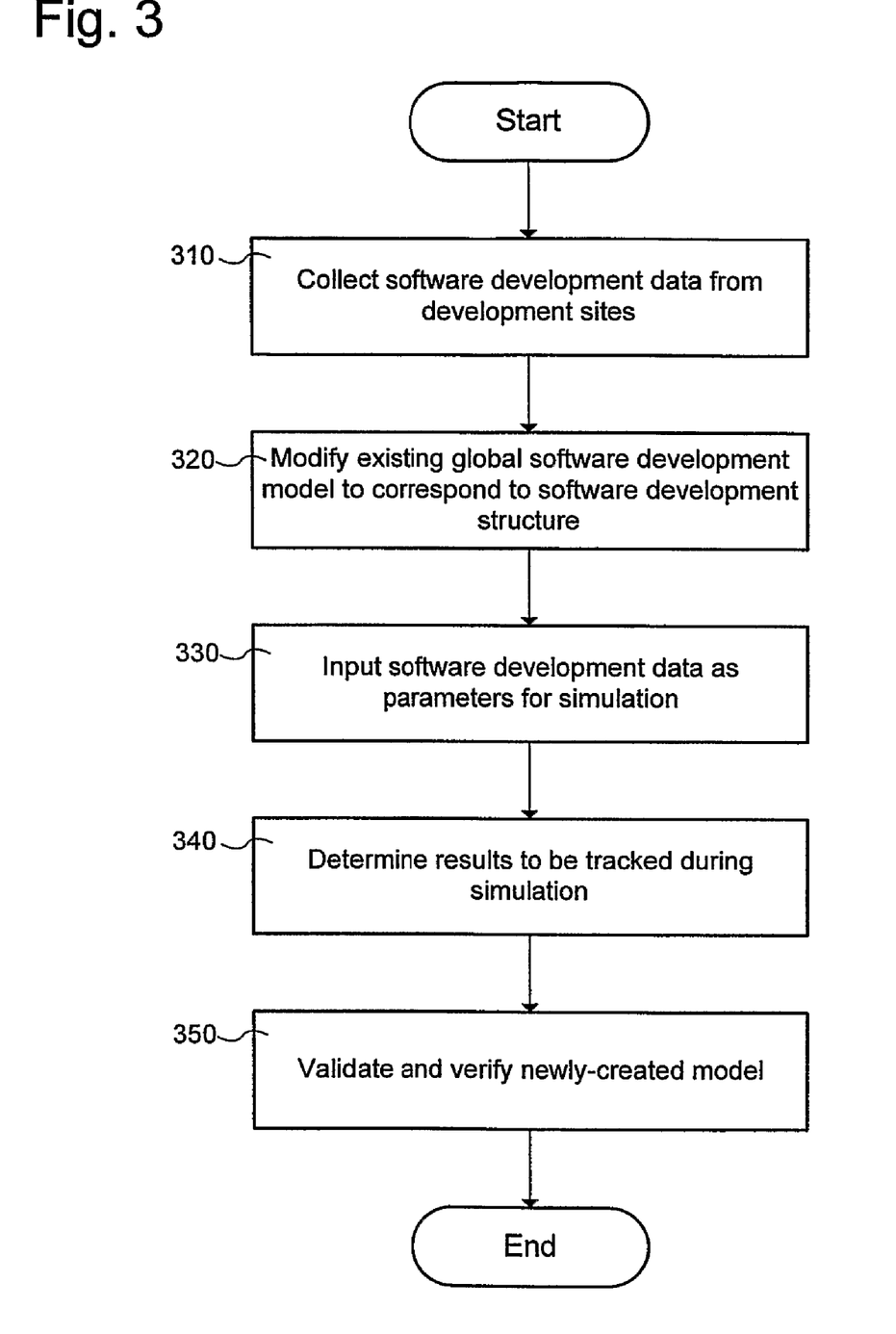
FIG. 3 is a flowchart illustrating one implementation of a method for creating a global software development model.

FIG. 3 illustrates one implementation of a process for creating a global software development model 150. In various implementations of the illustrated method, various blocks may be combined, split up, or removed while retaining inventive aspects of the process. In various implementations, the process of FIG. 3 may be performed by academics or policy-makers seeking to develop general models, or by manufacturers seeking to tailor a model to their particular needs. The process begins at block 310, where software development data is collected from development sites. In various implementations, the data collected at this process block may be from a manufacturer's internal data about development sites, may be gained from empirical studies of software or other product development in various countries, or may come from a global development data repository, such as described above.

Next, the process proceeds to block 320, where an existing global software development model is modified to correspond closely to the existing software development structure contemplated for simulation. In one implementation, this process will involve the creation or deletion of site-specific model components from the global software development model so that the model matches the available development sites. In another, this process can involve the modification of data taken from studies or a data repository to more closely match known parameters matching the current situation.

The process then continues to block 330, where software development data is input as parameters for simulation. In one implementation, this may involve providing the model or simulation software to an indication or location of a database contained in the global development project database 130. In another, all or part of the parameters can be entered by a user through the web browser 110 and web interface 120. Next, at block 340, a user can determine which results are to be tracked during simulation. As above, this may be done through the manipulation of a web page on the web browser 110 through the web interface 120, or may be contained in information located on the global development project database 130. Finally, at block 350, the user validates and verifies the newly-crated model to determine that, when a simulation is performed, the model represents the development situation contemplated, and accurately reports the metrics which it is to track.

Figure 4:
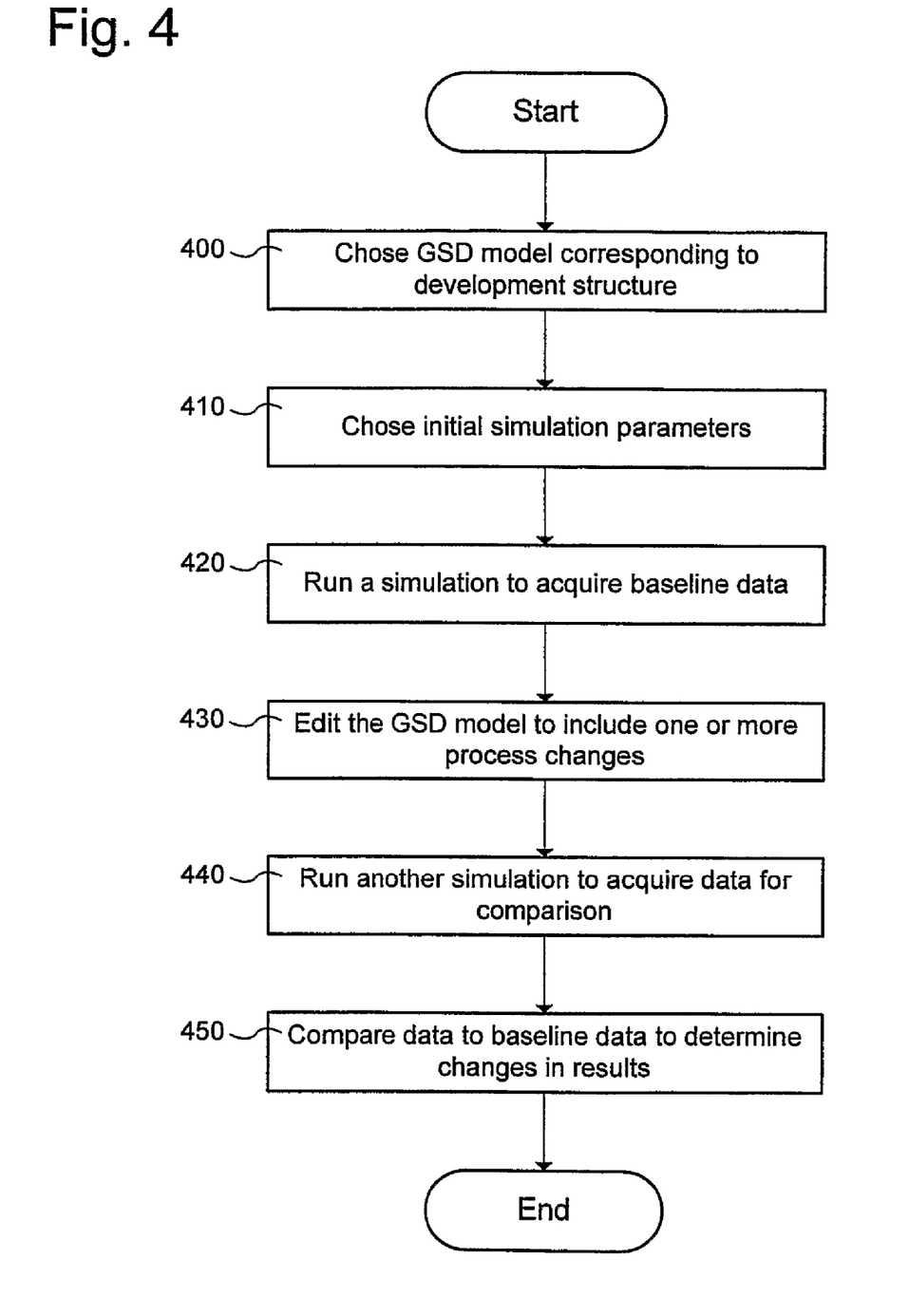
FIG. 4 is a flowchart illustrating one implementation of a method for predicting the result of a process change using a global software development model instrument.

FIG. 4 illustrates one implementation of a process for using a global software development model instrument for predicting the result of a process change. In various implementations of the illustrated method, various blocks may be combined, split up, or removed while retaining inventive aspects of the process. The process begins at block 400, where a global software development model is chosen which corresponds to the development structure for which predictions are desired. In one implementation, this process may involve the selection of a global software development model from a database or repository. In another, the chosen global software development model can be created from scratch. Next, at block 410, initial simulation parameters are chosen for the model. Typically, these will correspond to a normal product development situation or a current situation for which a change is to be modeled. In some implementations, a model will be chosen which was not created for the exact set of development sites which is currently being studied, but whose structure most closely corresponds to the one being studied.

Next, at block 420, a simulation is run with the initial simulation parameters to acquire a baseline of data from which to judge the results of process changes. Next, the global software development model is edited to include one or more process changes. In one implementation, such a change may be as small as a timeline change for a development site. In another, such a change could involve the inclusion of a new development site and importation of parameters to allow that site to be modeled, or the deletion of an entire development site. In this way, manufacturers or researchers can have the flexibility to adjust potential development changes within a single site, or to judge the effects of changing which sites the software is developed at.

Next, at block 440, another simulation is run using the modified global software model to acquire comparison data. Then, at block 450, the comparison data is compared to the baseline data from the process of block 430 to determine the results of the edits made in block 430. By this, a researcher or manufacturer can judge if the change is beneficial, and use the data to determine whether the change should be made in the development process or not.

3. Factors Included in the Scope of the GSD Model Instrument

A wide range of factors fall under the ambit of the global software development model instrument. Some of the general areas include, but are not limited to:

Communication issues: Communication overhead, team size effects, language differences, time zone differences, communication infrastructure richness, efficiency;

Cultural issues: Differences in background, training, experience, problem solving approaches, work ethic, management style, customs and traditions;

Coordination strategies: Methods, management approach, coordination tools, project planning, distribution effects, coordination infrastructure, artifact transfer strategies;

Manpower allocation strategies: Adjustments based upon dynamic project needs, allocation of people based upon relevant skills and experience;

Skills: Skill differentials, experience, training, and learning;

Productivity: Earned value, motivation, effects of project environment, team dynamics, schedule pressure, and management policies;

Staffing: Staffing levels, human resource issues, quit rates, transfer rates, overtime and so forth;

Product: Product and module size, complexity, number of defects, quality, security, reliability and other product characteristics that have been represented in the model or requirements;

Process: Process structure including process lifecycle (IEEE 12207, Rapid Prototyping, Rational Unified Process (RUP), Agile methods, Open Source, etc.) coupled with work transfer strategies—module-based allocation, phase-based allocation, integrated allocation or "follow-the-sun" development;

Project/Development type: Software only, software and systems, commercial, defense, internal, COTS, acquisition, or maintenance;

Quality assurance: Verification and validation (V&V) strategy (concurrent with testing and pre-test) for distributed development, rework strategy.

Additionally, the global software development model instrument supports a scope of performance measures covering at least the following: project schedule, product quality, defects, development cost, staffing levels, productivity, test effectiveness, communication driven delays, and added rework and product changes.

4. Computing Environment

The above described global software development model 150 and simulation software 140 (FIG. 1) can be implemented on any of a variety of computing devices and environments, including computers of various form factors (personal, workstation, server, handheld, laptop, tablet, or other mobile), distributed computing networks, and Web services, as a few general examples. The global software development model instrument 150 and simulation software 140 can be implemented in hardware circuitry, as well as in software 580 executing within a computer or other computing environment, such as shown in FIG. 5.

Figure 5:
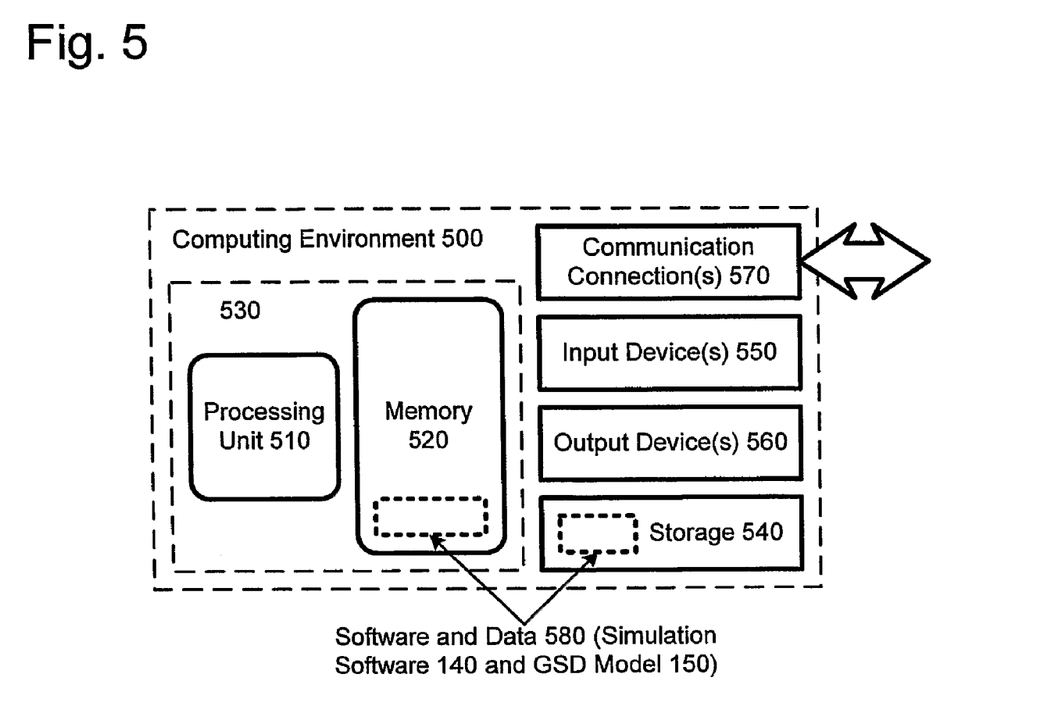
FIG. 5 is a block diagram of a suitable computing environment for implementing the global software development model instrument of FIG. 1.

FIG. 5 illustrates a generalized example of a suitable computing environment 500 in which the described techniques can be implemented. The computing environment 500 is not intended to suggest any limitation as to scope of use or functionality of the invention, as the present invention may be implemented in diverse general-purpose or special-purpose computing environments.

With reference to FIG. 5, the computing environment 500 includes at least one processing unit 510 and memory 520. In FIG. 5, this most basic configuration 530 is included within a dashed line. The processing unit 510 executes computer-executable instructions and may be a real or a virtual processor. In a multi-processing system, multiple processing units execute computer-executable instructions to increase processing power. The memory 520 may be volatile memory (e.g., registers, cache, RAM), non-volatile memory (e.g., ROM, EEPROM, flash memory, etc.), or some combination of the two. The memory 520 stores software 580 implementing the global software development model instrument 150 and simulation software 140.

A computing environment may have additional features. For example, the computing environment 500 includes storage 540, one or more input devices 550, one or more output devices 560, and one or more communication connections 570. An interconnection mechanism (not shown) such as a bus, controller, or network interconnects the components of the computing environment 500. Typically, operating system software (not shown) provides an operating environment for other software executing in the computing environment 500, and coordinates activities of the components of the computing environment 500.

The storage 540 may be removable or non-removable, and includes magnetic disks, magnetic tapes or cassettes, CD-ROMs, CD-RWs, DVDs, or any other medium which can be used to store information and which can be accessed within the computing environment 500. The storage 540 stores instructions for the software 580.

The input device(s) 550 (e.g., for devices operating as a control point in the global software development model instrument 150 and simulation software 140) may be a touch input device such as a keyboard, mouse, pen, or trackball, a voice input device, a scanning device, or another device that provides input to the computing environment 500. For audio, the input device(s) 550 may be a sound card or similar device that accepts audio input in analog or digital form, or a CD-ROM reader that provides audio samples to the computing environment. The output device(s) 560 may be a display, printer, speaker, CD-writer, or another device that provides output from the computing environment 500.

The communication connection(s) 570 enable communication over a communication medium to another computing entity. The communication medium conveys information such as computer-executable instructions, audio/video or other media information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The global software development model instrument techniques herein can be described in the general context of computer-readable media. Computer-readable media are any available media that can be accessed within a computing environment. By way of example, and not limitation, with the computing environment 500, computer-readable media include memory 520, storage 540, communication media, and combinations of any of the above.

The techniques herein can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

For the sake of presentation, the detailed description uses terms like "determine," "create," "acquire" and "edit" to describe computer operations in a computing environment. These terms are high-level abstractions for operations performed by a computer, and should not be confused with acts performed by a human being. The actual computer operations corresponding to these terms vary depending on implementation.

In view of the many possible embodiments to which the principles of our invention may be applied, we claim as our invention all such embodiments as may come within the scope and spirit of the following claims and equivalents thereto.

I claim:

1. A system for simulating distributed product development comprising a plurality of discrete projects which are developed at a plurality of development sites, the system comprising:
   a plurality of site-specific discrete event product development simulation models configured to model development at the plurality of development sites by operating on site-specific product development data to produce simulation metrics for the plurality of development sites, wherein each of the plurality of development sites is associated with a corresponding site-specific discrete event product development simulation model of the plurality of site-specific discrete event product development simulation models, and wherein each site-specific discrete event product development simulation model models actual development processes occurring at its associated development site; and
   a plurality of system dynamics simulation models, the system dynamics models configured to operate on product development data and simulation metrics to produce simulation metrics, the plurality of system dynamics simulation models comprising:
      a plurality of site-specific system dynamics models configured to interact with the site-specific discrete event product development simulation models, receive data and metrics, and produce simulation metrics for the plurality of development sites, wherein each of the plurality of development sites is associated with a corresponding site-specific system dynamics model of the plurality of site-specific system dynamics models; and
      one global system dynamics simulation model configured to interact with the plurality of site-specific system dynamics models, receive data and metrics, and product global product development simulation metrics.

2. The system of claim 1, wherein the one or more discrete event product development simulation models and the one or more system dynamics simulation models are configured to model software engineering processes.

3. The system of claim 2, wherein the plurality of system dynamics simulation models further comprises at least one interaction effects model configured to model factors associated with interactions between sites.

4. The system of claim 2, further comprising at least one discrete event product development simulation model configured to act as an interface between two site-specific discrete event product development models.

5. The system of claim 1, further comprising a product development database containing project information and process metrics.

6. The system of claim 5, wherein the plurality of site-specific discrete event product development simulation models are configured to communicate with the product development database.

7. The system of claim 6, wherein the project information contained in the product development database comprises software development information.

8. The system of claim 1, further comprising a web interface module, the interface module configured to accept indications of simulation parameters from a user and to provide simulation information to a user.

9. The system of claim 8, wherein the web interface module is further configured to accept indications of changes to process models and equations associated with process models and to cause those changes to be reflected in the plurality of site-specific discrete event product development simulation models and the plurality of system dynamics models.

10. The system of claim 8, wherein the web interface module is further configured to accept indications of data to be used by the plurality of system dynamics and discrete event models and to cause the models to utilize indicated data.

11. The system of claim 8, wherein the web interface module is further configured to accept indication of report parameters and to cause the system to produce reports in accordance with the report parameters.

12. The system of claim 8, wherein the web interface module is configured to respond to web page requests with one or more web pages comprising simulation information.

13. The system of claim 1, wherein the plurality of discrete event product development simulation models and plurality of dynamic simulation models comprise a plurality of data files which describe product development simulation modeling blocks and further comprising modeling software configured to allow manipulation of the product development simulation modeling blocks.

14. A computer-readable storage medium storing data which, when read by a computer, describe a global software development model measuring simulation metrics for a global software development project spanning a plurality of development sites, the model comprising:
    a plurality of site-specific discrete event simulation models configured to model development at the plurality of development sites by operating on site-specific product development data to produce simulation metrics for the plurality of development sites, wherein each of the plurality of development sites is associated with a corresponding site-specific discrete event simulation model of the plurality of site-specific discrete event simulation models;
    a plurality of site-specific system dynamics models configured to interact with the site-specific discrete event product development simulation models, receive data and metrics, and produce simulation metrics for the plurality of development sites, wherein each of the plurality of development sites is associated with a corresponding site-specific system dynamics model of the plurality of site-specific system dynamics models; and
    a global system dynamics model configured to interact with the plurality of site-specific system dynamics models, receive data and metrics, and produce global product development simulation metrics.

15. The computer-readable storage medium of claim 14, wherein the computer-readable media further comprises instructions which, when read by a computer, describe a simulation environment which allows a user to manipulate and utilize the system dynamics and discrete event simulation models.

16. The computer-readable storage medium of claim 14, wherein the global software development model further comprises one or more interaction effects models configured to model factors associated with interactions between sites.

17. The computer-readable storage medium of claim 14, wherein the computer-readable media further comprises instructions which, when read by a computer, describe an interface software module which is configured to provide simulation information to a user and accept simulation parameters from a user.

18. The computer-readable storage medium of claim 17, wherein the interface software module is configured to produce one or more web pages with simulation information and to accept simulation parameters from a user through a web browser.

19. A method for simulating a global software development project for a software development project performed over a plurality of software development simulation sites, the method comprising:
    collecting software development data from a plurality of software development data sites;
    selecting the plurality of software development simulation sites for which software development simulation will be performed, wherein the plurality of software development data sites is different from the plurality of software development simulation sites;
    passing the data as simulation parameters to a global software development model, the model comprising:
        a plurality of site-specific discrete event simulation models configured to model software development at the plurality of software development simulation sites and produce site-specific simulation metrics from the software development data, wherein the plurality of software development simulation sites are associated with respective corresponding site-specific discrete event simulation models; and
        a global system dynamics simulation model configured to accept data and simulation metrics and produce global simulation metrics for the global software development project; and
    receiving first simulated software development results data by utilizing the global software development model to simulate the software development project.

20. The method of claim 19, further comprising:
    changing one or more simulation parameters;
    receiving second simulated software development results data by utilizing the global software development model to simulate the software development project; and
    comparing the second results data to the first results data to determine the effect of the change in simulation parameters.

21. A system for simulating distributed product development utilizing a plurality of discrete projects which are developed at a plurality of development sites, the system comprising:
    a plurality of site-specific discrete event product development simulation models configured to model development at the plurality of development sites by operating operate on site-specific product development data to produce simulation metrics for the plurality of development sites, wherein each of the plurality of development sites is associated with a corresponding site-specific discrete event product development simulation model of the plurality of site-specific discrete event product development simulation models; and a plurality of system dynamics simulation models configured to operate on product development data and simulation metrics to produce simulation metrics;

wherein the plurality of site-specific discrete event product development simulation models and the plurality of system dynamics simulation models are configured such that the product development data or simulation metrics measure at least one of the following: communication issues, cultural issues, coordination strategies, manpower allocation strategies, skills, productivity, staffing, product, process, project type, development type, and quality assurance.

22. The system of claim 21, wherein the plurality of site-specific discrete event product development simulation models and the plurality of system dynamics simulation models are further configured such that the product development data or simulation metrics measure at least one of the following: project schedule, product quality, defects, development cost, staffing levels, productivity, test effectiveness, communication driven delays, added rework, and product changes.

* * * * *

UNITED STATES PATENT AND TRADEMARK OFFICE
CERTIFICATE OF CORRECTION

| | | |
|---|---|---|
| PATENT NO. | : 7,860,810 B2 | Page 1 of 1 |
| APPLICATION NO. | : 11/630511 | |
| DATED | : December 28, 2010 | |
| INVENTOR(S) | : Raffo | |

It is certified that error appears in the above-identified patent and that said Letters Patent is hereby corrected as shown below:

In the Drawings:

Fig. 4, "Chose" should be --Choose--. Both occurrences

In the Specification:

Column 3, line 66, "manipulation one" should be --manipulation of one--.

Column 5, lines 9-10, "web browser 120" should be --web interface 120--.

Column 5, line 51, "models.230." should be --models 230.--.

Column 7, line 21, "newly-crated" should be --newly-created--.

Column 10, line 56, "product" should be --produce--.

In the Claims:

Column 12, lines 64-65, "operating operate on" should be --operating on--.

Signed and Sealed this

Twenty-fifth Day of October, 2011

David J. Kappos
*Director of the United States Patent and Trademark Office*